US010872297B2

United States Patent
Kim et al.

(10) Patent No.: US 10,872,297 B2
(45) Date of Patent: Dec. 22, 2020

(54) LEARNING METHOD AND LEARNING DEVICE FOR GENERATING TRAINING DATA FROM VIRTUAL DATA ON VIRTUAL WORLD BY USING GENERATIVE ADVERSARIAL NETWORK, TO THEREBY REDUCE ANNOTATION COST REQUIRED IN TRAINING PROCESSES OF NEURAL NETWORK FOR AUTONOMOUS DRIVING, AND A TESTING METHOD AND A TESTING DEVICE USING THE SAME

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,085

(22) Filed: Dec. 31, 2019

(65) Prior Publication Data
US 2020/0242479 A1   Jul. 30, 2020

Related U.S. Application Data

(60) Provisional application No. 62/798,753, filed on Jan. 30, 2019.

(51) Int. Cl.
*G06N 3/08* (2006.01)
*G06F 16/58* (2019.01)
(Continued)

(52) U.S. Cl.
CPC ........... *G06N 3/084* (2013.01); *G05D 1/0088* (2013.01); *G06F 16/58* (2019.01);
(Continued)

(58) Field of Classification Search
CPC ...... G06N 3/0454; G06N 3/084; G06F 16/58; G05D 1/0088; G06K 9/00718;
(Continued)

(56) References Cited

U.S. PATENT DOCUMENTS

2018/0322366 A1*  11/2018  Lim ................... G06K 9/6255
2019/0114348 A1*   4/2019  Gao ................... H04L 9/0662
(Continued)

OTHER PUBLICATIONS

Wang et al., Video-to-Video Synthesis, pp. 1-14, Dec. 2018. (Year: 2018).*
(Continued)

*Primary Examiner* — Kamran Afshar
*Assistant Examiner* — Marshall L Werner
(74) *Attorney, Agent, or Firm* — Xsensus LLP (57) ABSTRACT

A learning method for transforming a virtual video on a virtual world to a more real-looking video is provided. And the method includes steps of: (a) a learning device instructing a generating CNN to apply a convolutional operation to an N-th virtual training image, N-th meta data and (N-K)-th reference information to generate an N-th feature map; (b) the learning device instructing the generating CNN to apply a deconvolutional operation to the N-th feature map to generate an N-th transformed image; (c) the learning device instructing a discriminating CNN to apply a discriminating CNN operation to the N-th transformed image to generate a
(Continued)

category score vector; (d) the learning device instructing the generating CNN to generate a generating CNN loss by referring to the category score vector and its corresponding GT, and to perform backpropagation by referring to the generating CNN loss to learn parameters of the generating CNN.

20 Claims, 4 Drawing Sheets

(51) Int. Cl.
    *G05D 1/00*     (2006.01)
    *G06K 9/00*     (2006.01)
    *G06K 9/62*     (2006.01)

(52) U.S. Cl.
    CPC ..... *G06K 9/00718* (2013.01); *G06K 9/00791* (2013.01); *G06K 9/6232* (2013.01); *G06K 9/6256* (2013.01); *G06K 9/6277* (2013.01)

(58) Field of Classification Search
    CPC ............ G06K 9/00791; G06K 9/6232; G06K 9/6256; G06K 9/6277
    See application file for complete search history.

(56) References Cited

U.S. PATENT DOCUMENTS

| | | | |
|---|---|---|---|
| 2019/0130278 A1* | 5/2019 | Karras | G06N 3/0454 |
| 2019/0244609 A1* | 8/2019 | Olabiyi | G10L 13/027 |
| 2019/0295302 A1* | 9/2019 | Fu | G06N 3/0454 |
| 2020/0265219 A1* | 8/2020 | Liu | G06K 9/00288 |

OTHER PUBLICATIONS

Johnson-Roberson et al., Driving in the Matrix: Can Virtual Worlds Replace Human Generated Annotations for Real World Tasks?, 8 pages, Feb. 2017. (Year: 2017).*
Ouyang et al., Pedestrian-Synthesis-GAN: Generating Pedestrian Data in Real Scene and Beyond, pp. 1-22, Apr. 2018. (Year: 2018).*
Fu et al., U.S. Appl. No. 62/666,187 (U.S. Appl. No. 15/16/631,941), US 2019/0295302—Segmentation Guided Image Generation with Adversarial Networks, May 2018. (Year: 2018).*
Isola et al., Image-to-Image Translation with Conditional Adversarial Networks, pp. 1-17, Nov. 2018. (Year: 2018).*
Karras et al., A Style-Based Generator Architecture for Generative Adversarial Networks, pp. 1-12, Dec. 2018. (Year: 2018).*
Hong et al., Conditional Generative Adversarial Network for Structured Domain Adaptation, 2018 IEEE/CVF Conference on Computer Vision and Pattern Recognition, pp. 1335-1344, 2018. (Year: 2018).*
Tulyakov et al., MoCoGAN: Decomposing Motion and Content for Video Generation, pp. 1-13, Dec. 2017. (Year: 2017).*
A. Bansal et al., "Recycle-GAN: Unsupervised Video Retargeting", Springer Nature Switzerland AG 2018, ECCV 2018, LNCS 11209, pp. 122-138, 2018.
L. Yang et al., "Real-to-Virtual Domain Unification for End-to-End Autonomous Driving", Springer Nature Switzerland AG 2018, ECCV 2018, LNCS 11208, pp. 553-570, 2018.
X. Pan et al., "Virtual to Real Reinforcement Learning for Autonomous Driving", pp. 1-13, 2017.
P. Li et al., Semantic-aware Grad-GAN for Virtual-Real Urban Scene Adaption, arXiv:1801.01726v2 [cs.CV], pp. 1-10, Jul. 14, 2018.

* cited by examiner

LEARNING METHOD AND LEARNING
DEVICE FOR GENERATING TRAINING
DATA FROM VIRTUAL DATA ON VIRTUAL
WORLD BY USING GENERATIVE
ADVERSARIAL NETWORK, TO THEREBY
REDUCE ANNOTATION COST REQUIRED
IN TRAINING PROCESSES OF NEURAL
NETWORK FOR AUTONOMOUS DRIVING,
AND A TESTING METHOD AND A TESTING
DEVICE USING THE SAME

CROSS REFERENCE OF RELATED
APPLICATION

This present application claims the benefit of the earlier filing date of provisional patent application No. 62/798,753, filed Jan. 30, 2019, the entire contents of which being incorporated herein by reference.

FIELD OF THE DISCLOSURE

The present disclosure relates to a learning method and a learning device for use with an autonomous vehicle; and more particularly, to the learning method and the learning device for generating training data from virtual data on a virtual world, and a testing method and a testing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Such CNNs have been widely used in a field of an autonomous driving. In the field of the autonomous driving, the CNNs may perform an object detection, a free space detection and a semantic segmentation.

An obstacle of the approach shown above, using CNNs in the field of the autonomous driving, is that the training sets cost a lot. In order to generate the training sets, training images can be acquired automatically, but their corresponding ground-truths (GTs) should be generated by people, resulting in much cost.

An alternative approach to overcome said obstacle is a virtual driving. In a virtual world simulated by a programmed computer, both of the training images and their corresponding GTs can be acquired automatically, resulting in lower cost.

However, this alternative approach has another obstacle that the training images acquired in the virtual world is different from images of real world, resulting in lower credibility on the CNNs trained in the virtual world.

SUMMARY OF THE DISCLOSURE

It is an object of the present disclosure to solve all the aforementioned problems.

It is another object of the present disclosure to provide a learning method for generating training data from virtual data on a virtual world by using a generative adversarial network, to thereby reduce annotation cost required in training processes of a neural network for autonomous driving.

It is still another object of the present disclosure to provide a learning method for transforming a virtual video on a virtual world to a more real-looking video whose characteristics are similar to those of a real video on a real world while maintaining constant and uniform relationships among frames thereof by using information on previous frames when transforming a current frame.

It is still yet another object of the present disclosure to provide a generating Convolutional Neural Network (CNN) for transforming a virtual video on a virtual world to a more real-looking video whose characteristics are similar to those of a real video on a real world while maintaining constant and uniform relationships among frames thereof by using information on previous frames when transforming a current frame, and a discriminating CNN for supporting a training process of the generating CNN.

In accordance with one aspect of the present disclosure, there is provided a learning method for transforming a virtual video on a virtual world to a more real-looking video whose characteristics are similar to those of a real video on a real world while maintaining constant and uniform relationships among frames thereof by using information on previous frames when transforming a current frame, including steps of: (a) a learning device, if (i) an N-th virtual training image corresponding to an N-th frame of the virtual video on the virtual world, (ii) N-th meta data on one or more objects included in the N-th virtual training image, and (iii) (N-K)-th reference information on an (N-K)-th frame of the virtual video are acquired, instructing at least one encoding layer in a generating Convolutional Neural Network (CNN) to apply at least one convolutional operation to the N-th virtual training image, the N-th meta data and the (N-K)-th reference information, to thereby generate at least one N-th feature map; (b) the learning device instructing a decoding layer in the generating CNN to apply at least one deconvolutional operation to the N-th feature map, to thereby generate an N-th transformed image; (c) the learning device instructing a discriminating CNN, which is trained adversely to the generating CNN, to apply at least one discriminating CNN operation to the N-th transformed image, to thereby generate a first estimated image category score vector including information on probabilities of the N-th transformed image being one of real images on the real world or one of virtual images on the virtual world; (d) the learning device instructing a generating loss layer in the generating CNN to generate at least one generating CNN loss by referring to the first estimated image category score vector and its corresponding first Ground-Truth (GT) image category score vector, and then to perform backpropagation by referring to the generating CNN loss, to thereby learn at least part of parameters of the generating CNN, wherein the learning device instructs the generating loss layer to train said at least part of the parameters of the generating CNN in order to make a probability of the discriminating CNN misdetermining a category of an image to be outputted from the generating CNN larger.

As one example, at the step of (a), the learning device instructs at least one adjusting layer in the generating CNN to apply at least one adjusting operation to the N-th feature map by referring to an N-th random seed value, to thereby generate an N-th adjusted feature map, and wherein, at the step of (b), the learning device instructs the decoding layer to apply the deconvolutional operation to the N-th adjusted feature map, to thereby generate the N-th transformed image.

As one example, at the step of (d), the learning device instructs a discriminating loss layer to generate a first discriminating CNN loss by referring to the first estimated image category score vector and the first GT image category score vector, and then performs backpropagation by using the first discriminating CNN loss, to thereby learn at least part of parameters of the discriminating CNN, and wherein the learning device instructs the discriminating loss layer to train said at least part of the parameters of the discriminating CNN in order to make a probability of the discriminating CNN correctly determining a category of its inputted image larger.

As one example, in parallel with the step of (a) to the step of (d), the learning device, if at least one real training image, among the real images, is acquired, (i) instructs the discriminating CNN to apply the discriminating CNN operation to the real training image, to thereby generate a second estimated image category score vector including information on probabilities of the real training image being one of the real images or one of the virtual images, and (ii) instructs the discriminating loss layer to generate a second discriminating CNN loss by referring to the second estimated image category score vector and its corresponding second GT image category score vector, and then performs backpropagation by using the second discriminating loss, to thereby learn at least part of the parameters of the discriminating CNN.

As one example, at the step of (a), the learning device instructs each of one or more convolutional neurons of the encoding layer to apply an operation to its inputted value by using its own parameter and then deliver its outputted value to its next convolutional neuron, to thereby apply the convolutional operation to the N-th virtual training image.

As one example, at the step of (a), the learning device (i) acquires (i-1) the N-th meta data including information on one or more locations and one or more classes of the objects in the N-th virtual training image and (i-2) the (N-K)-th reference information including at least part of an (N-K)-th virtual training image, an (N-K)-th transformed image and (N-K)-th meta data corresponding to the (N-K)-th frame of the virtual video, and (ii) instructs the generating CNN to apply the convolutional operation to the N-th virtual training image, the N-th meta data and the (N-K)-th reference information, to thereby generate the N-th feature map.

In accordance with another aspect of the present disclosure, there is provided a testing method for transforming a virtual video on a virtual world to a more real-looking video whose characteristics are similar to those of a real video on a real world while maintaining constant and uniform relationships among frames thereof by using information on previous frames when transforming a current frame, including steps of: (a) on condition that (1) a learning device, if (i) an N-th virtual training image corresponding to an N-th frame for training of a virtual video for training on the virtual world, (ii) N-th meta data for training on one or more objects for training included in the N-th virtual training image, and (iii) (N-K)-th reference information for training on an (N-K)-th frame for training of the virtual video for training are acquired, has instructed at least one encoding layer in a generating Convolutional Neural Network (CNN) to apply at least one convolutional operation to the N-th virtual training image, the N-th meta data for training and the (N-K)-th reference information for training, to thereby generate at least one N-th feature map for training; (2) the learning device has instructed a decoding layer in the generating CNN to apply at least one deconvolutional operation to the N-th feature map for training, to thereby generate an N-th transformed image for training; (3) the learning device has instructed a discriminating CNN, which is trained adversely to the generating CNN, to apply at least one discriminating CNN operation to the N-th transformed image for training, to thereby generate a first estimated image category score vector including information on probabilities of the N-th transformed image for training being one of real images on the real world or one of virtual images on the virtual world; (4) the learning device has instructed a generating loss layer in the generating CNN to generate at least one generating CNN loss by referring to the first estimated image category score vector and its corresponding first Ground-Truth (GT) image category score vector, and then to perform backpropagation by referring to the generating CNN loss, to thereby learn at least part of parameters of the generating CNN, wherein the learning device instructs the generating loss layer to train said at least part of the parameters of the generating CNN in order to make a probability of the discriminating CNN misdetermining a category of an image to be outputted from the generating CNN larger, a testing device, if (i) an N-th virtual testing image corresponding to an N-th frame for testing of a virtual video for testing on the virtual world, (ii) N-th meta data for testing on one or more objects for testing included in the N-th virtual testing image, and (iii) (N-K)-th reference information for testing on an (N-K)-th frame for testing of the virtual video for testing are acquired, instructing the encoding layer in the generating CNN to apply the convolutional operation to the N-th virtual testing image, the N-th meta data for testing and the (N-K)-th reference information for testing, to thereby generate at least one N-th feature map for testing; and (b) the testing device instructing the decoding layer in the generating CNN to apply the deconvolutional operation to the N-th feature map for testing, to thereby generate an N-th transformed image for testing.

As one example, the method further includes a step of: (c) the testing device performing (i) a process of inputting a transformed video for testing including the N-th transformed image for testing as its N-th frame for testing to an autonomous driving CNN as a training data, and (ii) a process of inputting an annotated transformed video for testing corresponding to the transformed video for testing to the autonomous driving CNN as a Ground-Truth (GT), to thereby support a training process of the autonomous driving CNN.

As one example, at the step of (c), the annotated transformed video for testing is acquired from a simulation module which has simulated the virtual world corresponding to the virtual video for testing.

As one example, at the step of (a), the testing device instructs at least one adjusting layer in the generating CNN 130 to apply at least one adjusting operation to the N-th feature map for testing by referring to an N-th random seed value, to thereby generate an N-th adjusted feature map for testing, and wherein, at the step of (b), the testing device instructs the decoding layer to apply the deconvolutional operation to the N-th adjusted feature map for testing, to thereby generate the N-th transformed image for testing.

As one example, at the step of (a), the testing device (i) acquires (i-1) the N-th meta data for testing including information on one or more locations and one or more classes of the objects in the N-th virtual testing image and (i-2) the (N-K)-th reference information for testing including at least part of an (N-K)-th virtual testing image, an (N-K)-th transformed image for testing and (N-K)-th meta data for testing corresponding to the (N-K)-th frame for testing of the virtual video for testing, and (ii) instructs the generating CNN to apply the convolutional operation to the N-th virtual testing image, the N-th meta data for testing and the (N-K)-th reference information for testing, to thereby generate the N-th feature map for testing.

In accordance with still another aspect of the present disclosure, there is provided a learning device for transforming a virtual video on a virtual world to a more real-looking video whose characteristics are similar to those of a real video on a real world while maintaining constant and uniform relationships among frames thereof by using information on previous frames when transforming a current frame, including: at least one memory that stores instructions; and at least one processor configured to execute the instructions to perform processes of: (I) if (i) an N-th virtual training image corresponding to an N-th frame of the virtual video on the virtual world, (ii) N-th meta data on one or more objects included in the N-th virtual training image, and (iii) (N-K)-th reference information on an (N-K)-th frame of the virtual video are acquired, instructing at least one encoding layer in a generating Convolutional Neural Network (CNN) to apply at least one convolutional operation to the N-th virtual training image, the N-th meta data and the (N-K)-th reference information, to thereby generate at least one N-th feature map; (II) instructing a decoding layer in the generating CNN to apply at least one deconvolutional operation to the N-th feature map, to thereby generate an N-th transformed image; (III) instructing a discriminating CNN, which is trained adversely to the generating CNN, to apply at least one discriminating CNN operation to the N-th transformed image, to thereby generate a first estimated image category score vector including information on probabilities of the N-th transformed image being one of real images on the real world or one of virtual images on the virtual world; (IV) instructing a generating loss layer in the generating CNN to generate at least one generating CNN loss by referring to the first estimated image category score vector and its corresponding first Ground-Truth (GT) image category score vector, and then to perform backpropagation by referring to the generating CNN loss, to thereby learn at least part of parameters of the generating CNN, wherein the processor instructs the generating loss layer to train said at least part of the parameters of the generating CNN in order to make a probability of the discriminating CNN misdetermining a category of an image to be outputted from the generating CNN larger.

As one example, at the process of (I), the processor instructs at least one adjusting layer in the generating CNN to apply at least one adjusting operation to the N-th feature map by referring to an N-th random seed value, to thereby generate an N-th adjusted feature map, and wherein, at the process of (II), the processor instructs the decoding layer to apply the deconvolutional operation to the N-th adjusted feature map, to thereby generate the N-th transformed image.

As one example, at the process of (IV), the processor instructs a discriminating loss layer to generate a first discriminating CNN loss by referring to the first estimated image category score vector and the first GT image category score vector, and then perform backpropagation by using the first discriminating CNN loss, to thereby learn at least part of parameters of the discriminating CNN, and wherein the processor instructs the discriminating loss layer to train said at least part of the parameters of the discriminating CNN in order to make a probability of the discriminating CNN correctly determining a category of its inputted image larger.

As one example, in parallel with the process of (I) to the process of (IV), the processor, if at least one real training image, among the real images, is acquired, (i) instructs the discriminating CNN to apply the discriminating CNN operation to the real training image, to thereby generate a second estimated image category score vector including information on probabilities of the real training image being one of the real images or one of the virtual images, and (ii) instructs the discriminating loss layer to generate a second discriminating CNN loss by referring to the second estimated image category score vector and its corresponding second GT image category score vector, and then perform backpropagation by using the second discriminating loss, to thereby learn at least part of the parameters of the discriminating CNN.

As one example, at the process of (I), the processor instructs each of one or more convolutional neurons of the encoding layer to apply an operation to its inputted value by using its own parameter and then deliver its outputted value to its next convolutional neuron, to thereby apply the convolutional operation to the N-th virtual training image.

As one example, at the process of (I), the processor (i) acquires (i-1) the N-th meta data including information on one or more locations and one or more classes of the objects in the N-th virtual training image and (i-2) the (N-K)-th reference information including at least part of an (N-K)-th virtual training image, an (N-K)-th transformed image and (N-K)-th meta data corresponding to the (N-K)-th frame of the virtual video, and (ii) instructs the generating CNN to apply the convolutional operation to the N-th virtual training image, the N-th meta data and the (N-K)-th reference information, to thereby generate the N-th feature map.

In accordance with still yet another aspect of the present disclosure, there is provided a testing device for transforming a virtual video on a virtual world to a more real-looking video whose characteristics are similar to those of a real video on a real world while maintaining constant and uniform relationships among frames thereof by using information on previous frames when transforming a current frame, including: at least one memory that stores instructions; and at least one processor configured to execute the instructions to perform processes of: (I) on condition that (1) a learning device, if (i) an N-th virtual training image corresponding to an N-th frame for training of a virtual video for training on the virtual world, (ii) N-th meta data for training on one or more objects for training included in the N-th virtual training image, and (iii) (N-K)-th reference information for training on an (N-K)-th frame for training of the virtual video for training are acquired, has instructed at least one encoding layer in a generating Convolutional Neural Network (CNN) to apply at least one convolutional operation to the N-th virtual training image, the N-th meta data for training and the (N-K)-th reference information for training, to thereby generate at least one N-th feature map for training; (2) the learning device has instructed a decoding layer in the generating CNN to apply at least one deconvolutional operation to the N-th feature map for training, to thereby generate an N-th transformed image for training; (3) the learning device has instructed a discriminating CNN, which is trained adversely to the generating CNN, to apply at least one discriminating CNN operation to the N-th transformed image for training, to thereby generate a first estimated image category score vector including information on probabilities of the N-th transformed image for training being one of real images on the real world or one of virtual images on the virtual world; (4) the learning device has instructed a generating loss layer in the generating CNN to generate at least one generating CNN loss by referring to the first estimated image category score vector and its corresponding first Ground-Truth (GT) image category score vector, and then to perform backpropagation by referring to the generating CNN loss, to thereby learn at least part of parameters of the generating CNN, wherein the learning device instructs the generating loss layer to train said at least part of the parameters of the generating CNN in order to make a probability of the discriminating CNN misdetermining a category of an image to be outputted from the generating CNN larger, if (i) an N-th virtual testing image corresponding to an N-th frame for testing of a virtual video for testing on the virtual world, (ii) N-th meta data for testing on one or more objects for testing included in the N-th virtual testing image, and (iii) (N-K)-th reference information for testing on an (N-K)-th frame for testing of the virtual video for testing are acquired, instructing the encoding layer in the generating CNN to apply the convolutional operation to the N-th virtual testing image, the N-th meta data for testing and the (N-K)-th reference information for testing, to thereby generate at least one N-th feature map for testing; and (II) instructing the decoding layer in the generating CNN to apply the deconvolutional operation to the N-th feature map for testing, to thereby generate an N-th transformed image for testing.

As one example, the processor further performs a process of: (III) performing (i) a process of inputting a transformed video for testing including the N-th transformed image for testing as its N-th frame for testing to an autonomous driving CNN as a training data, and (ii) a process of inputting an annotated transformed video for testing corresponding to the transformed video for testing to the autonomous driving CNN as a Ground-Truth (GT), to thereby support a training process of the autonomous driving CNN.

As one example, at the process of (III), the annotated transformed video for testing is acquired from a simulation module which has simulated the virtual world corresponding to the virtual video for testing.

As one example, at the process of (I), the processor instructs at least one adjusting layer in the generating CNN 130 to apply at least one adjusting operation to the N-th feature map for testing by referring to an N-th random seed value, to thereby generate an N-th adjusted feature map for testing, and wherein, at the process of (II), the processor instructs the decoding layer to apply the deconvolutional operation to the N-th adjusted feature map for testing, to thereby generate the N-th transformed image for testing.

As one example, at the process of (I), the processor (i) acquires (i-1) the N-th meta data for testing including information on one or more locations and one or more classes of the objects in the N-th virtual testing image and (i-2) the (N-K)-th reference information for testing including at least part of an (N-K)-th virtual testing image, an (N-K)-th transformed image for testing and (N-K)-th meta data for testing corresponding to the (N-K)-th frame for testing of the virtual video for testing, and (ii) instructs the generating CNN to apply the convolutional operation to the N-th virtual testing image, the N-th meta data for testing and the (N-K)-th reference information for testing, to thereby generate the N-th feature map for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

For reference, in the description below, the phrase "for training" or "training" is added for terms related to the learning process, and the phrase "for testing" or "testing" is added for terms related to the testing process, to avoid possible confusion.

Figure 1:
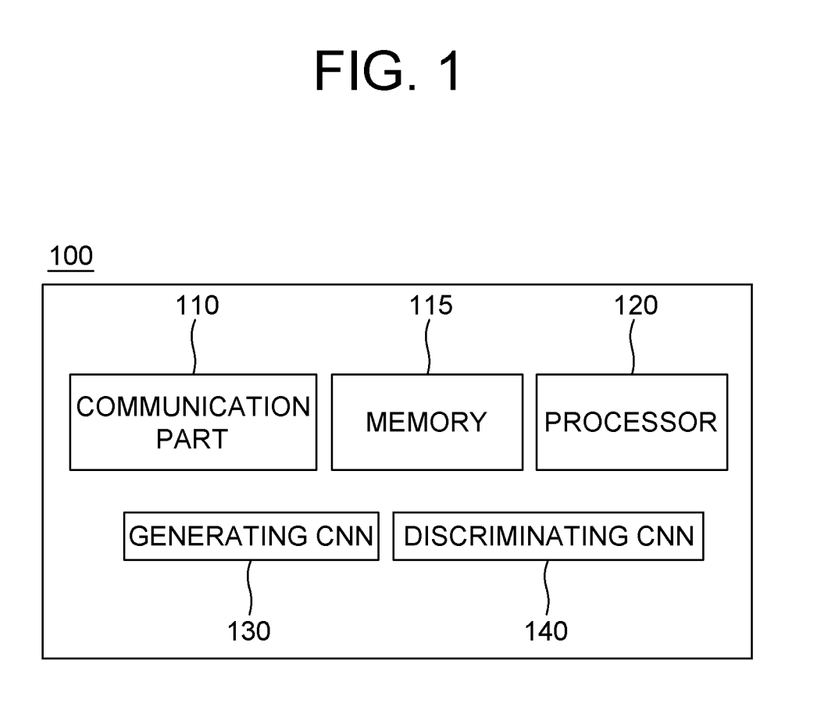
FIG. 1 is a drawing schematically illustrating a configuration of a learning device performing a learning method for generating training data from virtual data on a virtual world by using a generative adversarial network, to thereby reduce annotation cost required in training processes of a neural network for autonomous driving in accordance with one example embodiment of the present disclosure.

FIG. 1 is a drawing schematically illustrating a configuration of a learning device performing a learning method for generating training data from virtual data on a virtual world by using a generative adversarial network, to thereby reduce annotation cost required in training processes of a neural network for autonomous driving in accordance with one example embodiment of the present disclosure.

By referring to FIG. 1, the learning device 100 may include a generating Convolutional Neural Network (CNN) 130 and a discriminating CNN 140 to be described later. Processes of input/output and computations of the generating CNN 130 and the discriminating CNN 140 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

So far the configuration of the learning device 100 has been explained. Below, configurations of the generating CNN 130 and the discriminating CNN 140 included therein will be explained below. First, a configuration of the generating CNN 130 will be explained by referring to FIG. 2.

Figure 2:
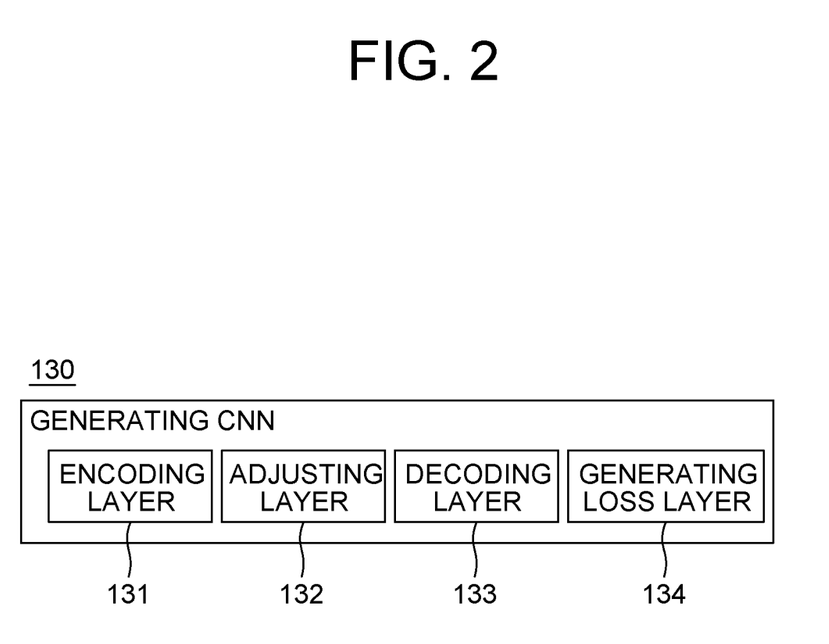
FIG. 2 is a drawing schematically illustrating a configuration of a generating Convolutional Neural Network (CNN) to be used for performing the learning method for generating the training data from the virtual data on the virtual world by using the generative adversarial network, to thereby reduce the annotation cost required in training processes of the neural network for the autonomous driving in accordance with one example embodiment of the present disclosure.

FIG. 2 is a drawing schematically illustrating a configuration of a generating Convolutional Neural Network (CNN) to be used for performing the learning method for generating the training data from the virtual data on the virtual world by using the generative adversarial network, to thereby reduce the annotation cost required in training processes of the neural network for the autonomous driving in accordance with one example embodiment of the present disclosure.

By referring to FIG. 2, the generating CNN 130 may include at least one encoding layer 131, at least one adjusting layer 132, at least one decoding layer 133 and at least one generating loss layer 134. Herein, the encoding layer 131 may perform a convolutional operation, the adjusting layer 132 may perform an adjusting operation and the decoding layer 133 may perform a deconvolutional operation. The generating loss layer 134 may generate a generating CNN loss to be used for training at least part of parameters of the generating CNN 130, and may perform backpropagation by using the generating CNN loss.

Regarding the convolutional operation, the learning device 100 may instruct each of one or more convolutional neurons of the encoding layer 131 to apply an operation to its inputted value by using its own parameter and then deliver its outputted value to its next convolutional neuron, to thereby apply the convolutional operation to a data inputted to the generating CNN 130.

Also, regarding the adjusting operation, the learning device 100 may instruct the adjusting layer 132 to adjust its inputted data by using a prescribed random seed value. Such adjusting operation will be explained specifically later. Meanwhile, the adjusting layer 132 itself may not be essential one for the generating CNN 130, but a selective one.

Regarding the deconvolutional operation, similar to the convolutional operation, the learning device may instruct each of one or more deconvolutional neurons of the decoding layer 133 to apply an operation to its inputted value by using its own parameter and then deliver its outputted value to its next deconvolutional neuron, to thereby apply the deconvolutional operation to a data inputted thereto. The convolutional operation and the deconvolutional operation may look similar, but the convolutional operation may be used for downsampling its inputted data, and the deconvolutional operation may be used for upsampling its inputted data.

Otherwise, the discriminating CNN 140 may be built by using any network architectures capable of performing a classification on its inputted image. That is, to be explained later, the only thing that the discriminating CNN 140 should perform is to classify its inputted image as its categories, i.e., real images on a real world and virtual images on a virtual world, to thereby calculate each of probabilities of the inputted image being included in each of the categories. Thus, any network capable of such function can be set as the discriminating CNN 140. As an example, a person in the art may build the discriminating CNN 140 including a convolutional layer for performing a convolutional operation, a pooling layer for performing a pooling operation and a Fully-Connected (FC) layer for performing an FC operation. Or, the person in the art may refer to a structure of a discriminator provided in a thesis named "Generative Adversarial Nets" by Goodfellow et al., which is a well-known prior art in a field of the Machine Learning, in order to build the discriminating CNN 140.

So far configurations of the learning device 100 itself and the generating CNN and the discriminating CNN included therein have been explained. Below, the learning method itself performed by them will be explained by referring to FIG. 3.

Figure 3:
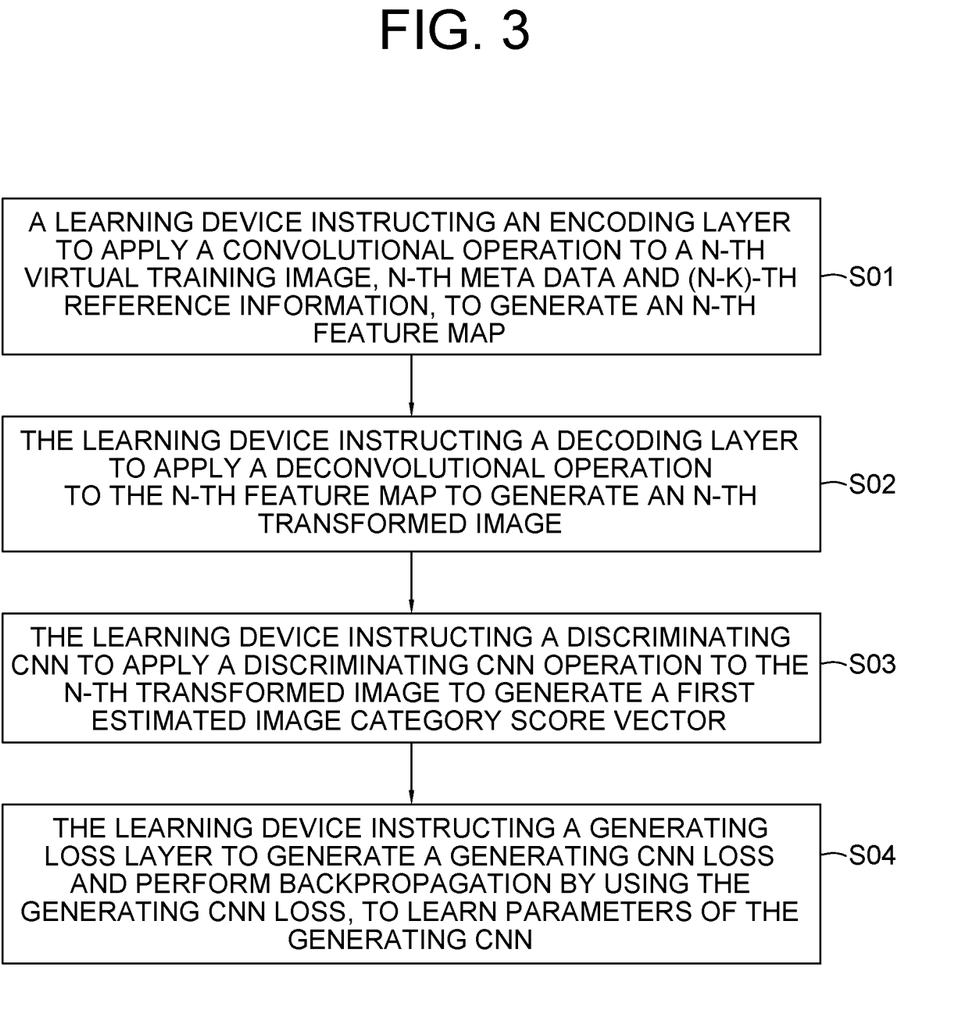
FIG. 3 is a drawing schematically illustrating a flow of the learning method for generating the training data from the virtual data on the virtual world by using the generative adversarial network, to thereby reduce the annotation cost required in training processes of the neural network for the autonomous driving in accordance with one example embodiment of the present disclosure.

FIG. 3 is a drawing schematically illustrating a flow of the learning method for generating the training data from the virtual data on the virtual world by using the generative adversarial network, to thereby reduce the annotation cost required in training processes of the neural network for the autonomous driving in accordance with one example embodiment of the present disclosure.

By referring to FIG. 3, at a step of S01, the learning device 100, if (i) an N-th virtual training image corresponding to an N-th frame of a virtual video on the virtual world, (ii) N-th meta data on objects included in the N-th virtual training image, and (iii) (N-K)-th reference information on an (N-K)-th frame of the virtual video are acquired, may instruct the encoding layer 131 in the generating CNN 130 to apply said at least one convolutional operation to the N-th virtual training image, the N-th meta data and the (N-K)-th reference information, to thereby generate at least one N-th feature map. Then, at a step of S02, the learning device 100 may instruct the decoding layer 133 in the generating CNN 130 to apply said at least one deconvolutional operation to the N-th feature map, to thereby generate an N-th transformed image. Thereafter, at a step of S03, the learning device 100 the discriminating CNN 140 to apply at least one discriminating CNN operation to the N-th transformed image, to thereby generate a first estimated image category score vector including information on probabilities of the N-th transformed image being one of the real images on the real world or one of the virtual images on the virtual world. Finally, at a step of S04, the learning device 100 may instruct a generating loss layer 134 in the generating CNN 130 to generate at least one generating CNN loss by referring to the first estimated image category score vector and its corresponding first Ground-Truth (GT) image category score vector, and then to perform backpropagation by referring to the generating CNN loss, to thereby learn at least part of the parameters of the generating CNN 130. N may be an integer equal to or larger than 2, and K may be an integer from 1 to N−1. Processes for a case of N being 1 may be similar to those above, but slightly different, to be explained later.

So far an overall structure of the learning method has been explained. Hereinafter, it will be explained more specifically. First, how a Generative Adversarial Network (GAN) scheme can be applied to the learning method will be explained, by referring to FIG. 4.

Figure 4:
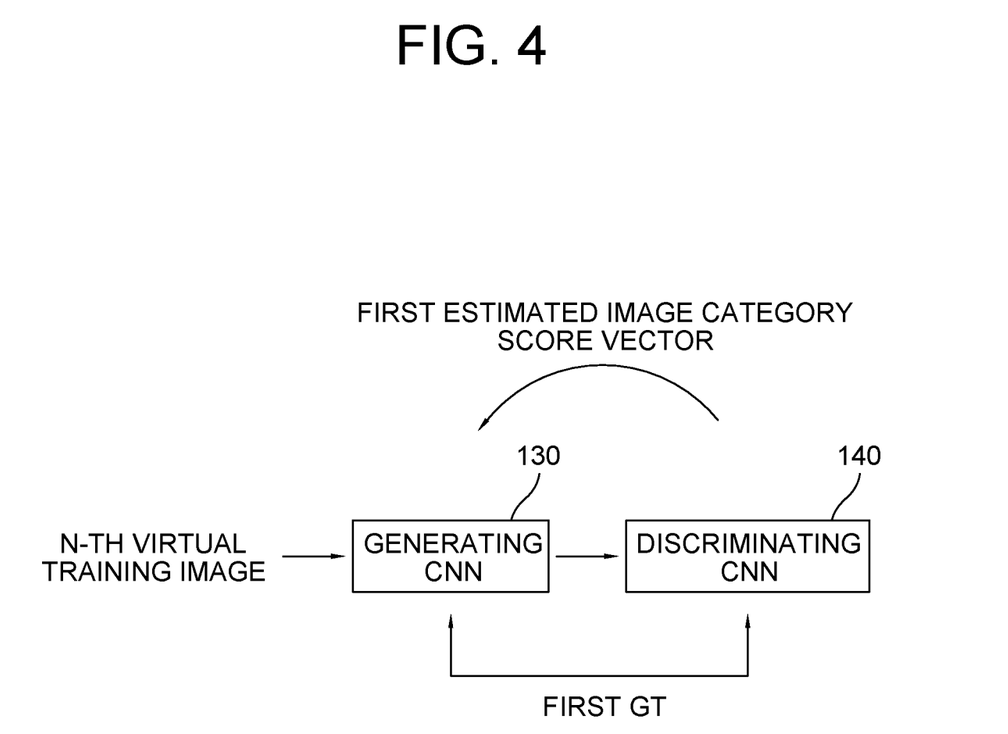
FIG. 4 is a drawing schematically illustrating how the generating CNN and a discriminating CNN interworks to perform the learning method for generating the training data from the virtual data on the virtual world by using the generative adversarial network, to thereby reduce the annotation cost required in training processes of the neural network for the autonomous driving in accordance with one example embodiment of the present disclosure.

FIG. 4 is a drawing schematically illustrating how the generating CNN and a discriminating CNN interworks to perform the learning method for generating the training data from the virtual data on the virtual world by using the generative adversarial network, to thereby reduce the annotation cost required in training processes of the neural network for the autonomous driving in accordance with one example embodiment of the present disclosure.

By referring to FIG. 4, the generating CNN 130 is trained by using a feedback, i.e., the first estimated image category score vector, from the discriminating CNN 140. Specifically, the generating CNN 130 acquires the N-th virtual training image as its input, and processes it to be more real-looking, to thereby generate the N-th transformed image. The discriminating CNN 140 may acquire the N-th transformed image, and determine whether it is one of the real images or one of the virtual images. If the discriminating CNN 140 determines the N-th transformed image as one of the real images, it can be confirmed that the generating CNN 130 has performed the transforming process well. On the other hand, if the discriminating CNN 140 determines the N-th transformed image as one of the virtual images, it can be confirmed that the generating CNN 130 has performed the transforming process not well. Such result is reflected on the generating CNN loss, and it is used for training the generating CNN 130 to make a probability of the discriminating CNN 140 misdetermining, i.e., determining incorrectly, a category of an image to be outputted from the generating CNN 130 larger.

Such discriminating CNN 140 can be trained in parallel to the generating CNN 130. It can be also said that the two CNNs are trained adversely, because, during training processes, the generating CNN 130 tries to deceive the discriminating CNN 140, and the discriminating CNN 140 tries not to be deceived. That is, the discriminating CNN 140 instructs its discriminating loss layer to generate a first discriminating CNN loss by referring to the first estimated image category score vector which has been generated when determining the N-th transformed image and the first GT image category score vector, and then perform backpropagation by using the first discriminating CNN loss, to thereby learn at least part of parameters of the discriminating CNN 140. Through this process, the discriminating CNN 140 may become smarter, so that a probability of the discriminating CNN 140 correctly determining a category of its inputted image becomes larger.

However, if the discriminating network 140 is trained by using only outputs from the generating CNN 130 such as the N-th transformed image which are originally virtual images, the discriminating network 140 may not function properly. Thus, real images are used for training the discriminating network 140 too. That is, in parallel with the steps of S01 to S04, the learning device 100, if at least one real training image, among the real images, is acquired, may (i) instruct the discriminating CNN 140 to apply the discriminating CNN operation to the real training image, to thereby generate a second estimated image category score vector including information on probabilities of the real training image being one of the real images or one of the virtual images, and (ii) instruct the discriminating loss layer to generate a second discriminating CNN loss by referring to the second estimated image category score vector and its corresponding second GT image category score vector, and then perform backpropagation by using the second discriminating loss, to thereby learn at least part of the parameters of the discriminating CNN 140.

So far an overall concept of the learning method along with a training process of the discriminating CNN 140 supporting the process of the generating CNN 130 have been explained. Below, implementation details of the generating CNN 130, which is a main part of the present disclosure will be explained.

First, the N-th virtual training image, to be inputted to the generating CNN 130, will be explained. The N-th virtual training image may be an image photographed from a virtual vehicle in the virtual world which has been simulated by a simulation module. Such N-th virtual training image may have a higher chroma and a higher contrast than the real images, and may have some unrealistic characteristics such as unnatural routes of rays. The generating CNN 130 may not directly transform it to the N-th transformed image, but acquire some additional information and then transform it thereto.

Herein, the additional information may be the N-th meta data and the (N-K)-th reference information corresponding to the (N-K)-th frame of the virtual video. The N-th meta data may include information on one or more locations and one or more classes of the objects in the N-th virtual training image. The (N-K)-th reference information may include information on the (N-K)-th frame, and such information is used for maintaining constant and uniform relationships among frames of the virtual video while the virtual video is transformed. As an example, K may be 1. Such (N-K)-th reference information may include at least part of an (N-K)-th virtual training image, an (N-K)-th transformed image and (N-K)-th meta data corresponding to the (N-K)-th frame. To be simple, information on (i) a previous frame before it is transformed, (ii) the previous frame after it is transformed, and (iii) objects included in the previous frame can be used for transforming a current frame.

However, a person in the art may be curious about a case of transforming a first frame, i.e., when N is 1, since it does not have any previous frames. In this case, information on the first frame may be just reused. As an example, assuming that in case N is equal to or larger than 2, the N-th virtual training image is inputted to a first input node, the N-th meta data is inputted to the second input node and the (N-K)-th reference information is inputted to the third input node. In this example, each of a first virtual training image and first meta data corresponding thereto may be inputted to each of the first and the second input nodes, and first reference information including the first virtual training image, the first meta data and the first virtual training image may be inputted to the third input node. It is built as shown above to maintain consistency in inputs of the nodes.

Also, in order to make the generating CNN 130 to generate more sufficient and diversified outputs, the adjusting layer 132 can be selectively used. The adjusting operation performed by the adjusting layer 132 is an operation that adjusts the N-th feature map generated by the encoding layer 131 by referring to an N-th random seed value which had been acquired beforehand for the N-th frame. If only operations based on a neural network scheme are used, outputs of the generating CNN 130 may become too monotonous, thus the random seed values including the N-th random seed value are used for transforming each of the frames. However, what is transformed is a "video" including a plurality of frames, not a single image, synchronization between the frames are necessary. Thus, some of the frames which are relatively closer to each other may share a fixed random seed value. To implement the learning method simply, the random seed value may be fixed for the entire frames of the virtual video.

After the N-th adjusted feature map, which is an output of the adjusting layer 132, is generated, the learning device 100 may instruct the decoding layer 133 to apply the deconvolutional operation to the N-th feature map, to thereby generate the N-th transformed image. Processes afterwards may be performed as same as shown above.

Hereinafter, how the generating CNN 130, which has been trained by using the learning method as shown above, can be tested will be explained below.

First, on condition that (1) the learning device 100, if (i) an N-th virtual training image corresponding to an N-th frame for training of a virtual video for training on the virtual world, (ii) N-th meta data for training on one or more objects for training included in the N-th virtual training image, and (iii) (N-K)-th reference information for training on an (N-K)-th frame for training of the virtual video for training are acquired, has instructed the encoding layer 131 in the generating CNN 130 to apply at least one convolutional operation to the N-th virtual training image, the N-th meta data for training and the (N-K)-th reference information for training, to thereby generate at least one N-th feature map for training; (2) the learning device 100 has instructed the decoding layer 133 in the generating CNN to apply at least one deconvolutional operation to the N-th feature map for training, to thereby generate an N-th transformed image for training; (3) the learning device 100 has instructed the discriminating CNN 140, which is trained adversely to the generating CNN 130, to apply at least one discriminating CNN operation to the N-th transformed image for training, to thereby generate a first estimated image category score vector including information on probabilities of the N-th transformed image for training being one of real images on the real world or one of virtual images on the virtual world; (4) the learning device 100 has instructed the generating loss layer 134 in the generating CNN to generate at least one generating CNN loss by referring to the first estimated image category score vector and its corresponding first Ground-Truth (GT) image category score vector, and then to perform backpropagation by referring to the generating CNN loss, to thereby learn at least part of parameters of the generating CNN 130, wherein the learning device has instructed the generating loss layer to train said at least part of the parameters of the generating CNN 130 in order to make a probability of the discriminating CNN 140 misdetermining a category of an image to be outputted from the generating CNN larger, a testing device, if (i) an N-th virtual testing image corresponding to an N-th frame for testing of a virtual video for testing on the virtual world, (ii) N-th meta data for testing on one or more objects for testing included in the N-th virtual testing image, and (iii) (N-K)-th reference information for testing on an (N-K)-th frame for testing of the virtual video for testing are acquired, may instruct the encoding layer 131 in the generating CNN 130 to apply the convolutional operation to the N-th virtual testing image, the N-th meta data for testing and the (N-K)-th reference information for testing, to thereby generate at least one N-th feature map for testing.

Thereafter, the testing device may instruct the decoding layer 133 in the generating CNN 130 to apply the deconvolutional operation to the N-th feature map for testing, to thereby generate an N-th transformed image for testing.

Herein, the (N-K)-th reference information for testing may include at least part of an (N-K)-th virtual testing image, an (N-K)-th transformed image for testing and (N-K)-th meta data for testing corresponding to the (N-K)-th frame for testing of the virtual video for testing. Also, for the testing processes, the testing device may instruct the adjusting layer 132 to apply the adjusting operation to the N-th feature map for testing by referring to an N-th random seed value, to thereby generate an N-th adjusted feature map for testing. Also, the testing device may generate the N-th transformed image for testing by applying the deconvolutional operation to the N-th adjusted feature map for testing.

As the N-th transformed image for testing is generated, a transformed video for testing, including the N-th transformed image for testing as its N-th frame for testing, can be generated. Then, the testing device may input the transformed video for testing to an autonomous driving CNN as a training data. Also, in parallel with this, the testing device may input an annotated transformed video for testing corresponding to the transformed video for testing to the autonomous driving CNN, as a GT. Such inputting processes are for supporting a training process of the autonomous driving CNN.

Herein, the annotated transformed video for testing may be acquired from a simulation module which has simulated the virtual world corresponding to the virtual video for testing. If the real images are used for training the autonomous driving CNN, it costs a lot, because human labor is needed to acquire annotation information on the real images. However, in case of using the transformed video for testing, the annotated transformed video, including annotation information thereof, can be acquired automatically from the simulation module, resulting in the reduction of the costs for training the autonomous driving CNN.

The present disclosure has an effect of the present disclosure to provide a learning method for generating training data from virtual data on a virtual world by using a generative adversarial network, to thereby reduce annotation cost required in training processes of a neural network for autonomous driving.

The present disclosure has another effect of the present disclosure to provide a learning method for transforming a virtual video on a virtual world to a more real-looking video whose characteristics are similar to those of a real video on a real world while maintaining constant and uniform relationships among frames thereof by using information on previous frames when transforming a current frame.

The present disclosure has still another effect of It is still yet another object of the present disclosure to provide a generating Convolutional Neural Network (CNN) for transforming a virtual video on a virtual world to a more real-looking video whose characteristics are similar to those of a real video on a real world while maintaining constant and uniform relationships among frames thereof by using information on previous frames when transforming a current frame, and a discriminating CNN for supporting a training process of the generating CNN.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for transforming a virtual video on a virtual world to a more real-looking video whose characteristics are similar to those of a real video on a real world while maintaining constant and uniform relationships among frames thereof by using information on previous frames when transforming a current frame, comprising steps of:

(a) a learning device, implemented as a programmed computer, under a condition of (i) an N-th virtual training image corresponding to an N-th frame of the virtual video on the virtual world, (ii) N-th meta data on one or more objects included in the N-th virtual training image, and (iii) (N-K)-th reference information on an (N-K)-th frame of the virtual video are acquired, instructing at least one encoding layer in a generating Convolutional Neural Network(CNN) to apply at least one convolutional operation to the N-th virtual training image, the N-th meta data and the (N-K)-th reference information, to thereby generate at least one N-th feature map;

(b) the learning device instructing a decoding layer in the generating CNN to apply at least one deconvolutional operation to the at least one N-th feature map, to thereby generate an N-th transformed image;

(c) the learning device instructing a discriminating CNN, which is trained adversely to the generating CNN, to apply at least one discriminating CNN operation to the N-th transformed image, to thereby generate a first estimated image category score vector including information on probabilities of the N-th transformed image being one of real images on the real world or one of virtual images on the virtual world;

(d) the learning device instructing a generating loss layer in the generating CNN to generate at least one generating CNN loss by referring to the first estimated image category score vector and its corresponding first Ground-Truth(GT) image category score vector, and then to perform backpropagation by referring to the generating CNN loss, to thereby learn at least some parameters of the generating CNN, wherein the learning device instructs the generating loss layer to train said at least some parameters of the generating CNN in order to make a probability of the discriminating CNN misdetermining a category of an image to be outputted from the generating CNN larger, at (a), the learning device instructing at least one adjusting laver in the generating CNN to apply at least one adjusting operation to the at least one N-th feature map by referring to an N-th random seed value, to thereby generate at least one N-th adjusted feature map, at (b), the learning device instructing the decoding laver to apply the deconvolutional operation to the at least one N-th adjusted feature map, to thereby generate the N-th transformed image, and repeating (a), (b), (c) and (d) for each frame of the virtual video on the virtual world, wherein each random seed value with its corresponding different index is separately and independently generated.

2. The method of claim 1, wherein, at the step of (d), the learning device instructs a discriminating loss layer to generate a first discriminating CNN loss by referring to the first estimated image category score vector and the first GT image category score vector, and then performs backpropagation by using the first discriminating CNN loss, to thereby learn at least some parameters of the discriminating CNN, and wherein the learning device instructs the discriminating loss layer to train said at least some the parameters of the discriminating CNN in order to make a probability of the discriminating CNN correctly determining a category of its inputted image larger.

3. The method of claim 2, wherein, in parallel with the step of (a) to the step of (d), the learning device, under a condition of at least one real training image, among the real images, is acquired, (i) instructs the discriminating CNN to apply the discriminating CNN operation to the real training image, to thereby generate a second estimated image category score vector including information on probabilities of the real training image being one of the real images or one of the virtual images, and (ii) instructs the discriminating loss layer to generate a second discriminating CNN loss by referring to the second estimated image category score vector and its corresponding second GT image category score vector, and then performs backpropagation by using the second discriminating loss, to thereby learn at least some parameters of the discriminating CNN.

4. The method of claim 1, wherein, at the step of (a), the learning device instructs each of one or more convolutional neurons of the encoding layer to apply an operation to its inputted value by using its own parameter and then deliver its outputted value to its next convolutional neuron, to thereby apply the convolutional operation to the N-th virtual training image.

5. The method of claim 1, wherein, at the step of (a), the learning device (i) acquires (i-1) the N-th meta data including information on one or more locations and one or more classes of the objects in the N-th virtual training image and (i-2) the (N-K)-th reference information including at least part of an (N-K)-th virtual training image, an (N-K)-th transformed image and (N-K)-th meta data corresponding to the (N-K)-th frame of the virtual video, and (ii) instructs the generating CNN to apply the convolutional operation to the N-th virtual training image, the N-th meta data and the (N-K)-th reference information, to thereby generate the at least one N-th feature map.

6. A testing method for transforming a virtual video on a virtual world to a more real-looking video whose characteristics are similar to those of a real video on a real world while maintaining constant and uniform relationships among frames thereof by using information on previous frames when transforming a current frame, comprising steps of:
(a) on condition that (1) a learning device, implemented as a programmed computer, under a condition of (i) an N-th virtual training image corresponding to an N- th frame for training of a virtual video for training on the virtual world, (ii) N-th meta data for training on one or more objects for training included in the N-th virtual training image, and (iii) (N-K)-th reference information for training on an (N-K)-th frame for training of the virtual video for training are acquired, has instructed at least one encoding layer in a generating Convolutional Neural Network(CNN) to apply at least one convolutional operation to the N-th virtual training image, the N-th meta data for training and the (N-K)-th reference information for training, to thereby generate at least one N-th feature map for training; (2) the learning device has instructed a decoding layer in the generating CNN to apply at least one deconvolutional operation to the at least one N-th feature map for training, to thereby generate an N-th transformed image for training; (3) the learning device has instructed a discriminating CNN, which is trained adversely to the generating CNN, to apply at least one discriminating CNN operation to the N-th transformed image for training, to thereby generate a first estimated image category score vector including information on probabilities of the N-th transformed image for training being one of real images on the real world or one of virtual images on the virtual world; (4) the learning device has instructed a generating loss layer in the generating CNN to generate at least one generating CNN loss by referring to the first estimated image category score vector and its corresponding first Ground-Truth(GT) image category score vector, and then to perform backpropagation by referring to the generating CNN loss, to thereby learn at least some parameters of the generating CNN, wherein the learning device has instructed the generating loss layer to train said at least some parameters of the generating CNN in order to make a probability of the discriminating CNN misdetermining a category of an image to be outputted from the generating CNN larger, at (1), the learning device instructing at least one adjusting layer in the generating CNN to apply at least one adjusting operation to the at least one N-th feature map by referring to an N-th random seed value, to thereby generate at least one N-th adjusted feature map, at (2), the learning device instructing the decoding layer to apply the deconvolutional operation to the at least one N-th adjusted feature map, to thereby generate the N- th transformed image, and repeating (1), (2), (3) and (4) for each frame of the virtual video on the virtual world, wherein each random seed value with its corresponding different index is separately and independently generated, a testing device, implemented with the programmed computer, under a condition of (i) an N-th virtual testing image corresponding to an N-th frame for testing of a virtual video for testing on the virtual world, (ii) N-th meta data for testing on one or more objects for testing included in the N-th virtual testing image, and (iii) (N-K)-th reference information for testing on an (N-K)-th frame for testing of the virtual video for testing are acquired, instructing the encoding layer in the generating CNN to apply the convolutional operation to the N-th virtual testing image, the N-th meta data for testing and the (N-K)-th reference information for testing, to thereby generate at least one N-th feature map for testing; and (b) the testing device instructing the decoding layer in the generating CNN to apply the deconvolutional operation to the at least one N-th feature map for testing, to thereby generate an N-th transformed image for testing.

7. The method of claim 6, further comprising a step of:
(c) the testing device performing (i) a process of inputting a transformed video for testing including the N-th transformed image for testing as its N-th frame for testing to an autonomous driving CNN as a training data, and (ii) a process of inputting an annotated transformed video for testing corresponding to the transformed video for testing to the autonomous driving CNN as a Ground-Truth(GT), to thereby support a training process of the autonomous driving CNN.

8. The method of claim 7, wherein, at the step of (c), the annotated transformed video for testing is acquired from a simulation module which has simulated the virtual world corresponding to the virtual video for testing.

9. The method of claim 6, wherein, at the step of (a), the testing device instructs at least one adjusting layer in the generating CNN to apply at least one adjusting operation to the at least one N-th feature map for testing by referring to an N-th random seed value, to thereby generate at least one N-th adjusted feature map for testing, and
wherein, at the step of (b), the testing device instructs the decoding layer to apply the deconvolutional operation to the at least one N-th adjusted feature map for testing, to thereby generate the N-th transformed image for testing.

10. The method of claim 6, wherein, at the step of (a), the testing device (i) acquires (i-1) the N-th meta data for testing including information on one or more locations and one or more classes of the objects in the N-th Virtual testing image and (i-2) the (N-K)-th reference information for testing including at least part of an (N-K)-th virtual testing image, an (N-K)-th transformed image for testing and (N-K)-th meta data for testing corresponding to the (N-K)-th frame for testing of the virtual video for testing, and (ii) instructs the generating CNN to apply the convolutional operation to the N-th virtual testing image, the N- th meta data for testing and the (N-K)-th reference information for testing, to thereby generate the at least one N-th feature map for testing.

11. A learning device for transforming a virtual video on a virtual world to a more real-looking video whose characteristics are similar to those of a real video on a real world while maintaining constant and uniform relationships among frames thereof by using information on previous frames when transforming a current frame, comprising:
at least one memory that stores instructions: and
at least one processor configured to execute the instructions to perform processes of:
(I) if (i) an N-th virtual training image corresponding to an N-th frame of the virtual video on the virtual world, (ii) N-th meta data on one or more objects included in the N-th virtual training image, and (iii) (N-K)-th reference information on an (N-K)-th frame of the virtual video are acquired, instructing at least one encoding layer in a generating Convolutional Neural Network(CNN) to apply at least one convolutional operation to the N-th virtual training image, the N-th meta data and the (N-K)-th reference information, to thereby generate at least one N-th feature map; (II) instructing a decoding layer in the generating CNN to apply at least one deconvolutional operation to the at least one N-th feature map, to thereby generate an N-th transformed image; (Ill) instructing a discriminating CNN, which is trained adversely to the generating CNN, to apply at least one discriminating CNN operation to the N-th transformed image, to thereby generate a first estimated image category score vector including information on probabilities of the N-th transformed image being one of real images on the real world or one of virtual images on the virtual world; (IV) instructing a generating loss layer in the generating CNN to generate at least one generating CNN loss by referring to the first estimated image category score vector and its corresponding first Ground-Truth(GT) image category score vector, and then to perform backpropagation by referring to the generating CNN loss, to thereby learn at least some parameters of the generating CNN, wherein the processor instructs the generating loss layer to train said at least some parameters of the generating CNN in order to make a probability of the discriminating CNN misdetermining a category of an image to be outputted from the generating CNN larger, wherein
at the process of (I), the processor instructs at least one adjusting laver in the generating CNN to apply at least one adjusting operation to the at least one N-th feature map by referring to an N-th random seed value, to thereby generate at least one N-th adjusted feature map, and
wherein, at the process of (II), the processor instructs the decoding laver to apply the deconvolutional operation to the at least one N-th adjusted feature map, to thereby generate the N-th transformed image, and the processor repeats (I), (II), (Ill), and (IV) for each frame of the virtual video on the virtual world, wherein each random seed value with its corresponding different index is separately and independently generated.

12. The device of claim 11, wherein, at the process of (IV), the processor instructs a discriminating loss layer to generate a first discriminating CNN loss by referring to the first estimated image category score vector and the first GT image category score vector, and then performs backpropagation by using the first discriminating CNN loss, to thereby learn at least some parameters of the discriminating CNN, and
wherein the processor instructs the discriminating loss layer to train said at least some parameters of the discriminating CNN in order to make a probability of the discriminating CNN correctly determining a category of its inputted image larger.

13. The device of claim 12, wherein, in parallel with the process of (I) to the process of (IV), the processor, under a condition of at least one real training image, among the real images, is acquired, (i) instructs the discriminating CNN to apply the discriminating CNN operation to the real training image, to thereby generate a second estimated image category score vector including information on probabilities of the real training image being one of the real images or one of the virtual images, and (ii) instructs the discriminating loss layer to generate a second discriminating CNN loss by referring to the second estimated image category score vector and its corresponding second GT image category score vector, and then performs backpropagation by using the second discriminating loss, to thereby learn at least some parameters of the discriminating CNN.

14. The device of claim 11, wherein, at the process of (I), the processor instructs each of one or more convolutional neurons of the encoding layer to apply an operation to its inputted value by using its own parameter and then deliver its outputted value to its next convolutional neuron, to thereby apply the convolutional operation to the N-th virtual training image.

15. The device of claim 11, wherein, at the process of (I), the processor (i) acquires (i-1) the N-th meta data including information on one or more locations and one or more classes of the objects in the N-th virtual training image and (i-2) the (N-K)-th reference information including at least part of an (N-K)-th virtual training image, an (N-K)-th transformed image and (N-K)-th meta data corresponding to the (N-K)-th frame of the virtual video, and (ii) instructs the generating CNN to apply the convolutional operation to the N-th virtual training image, the N-th meta data and the (N-K)-th reference information, to thereby generate the at least one N-th feature map.

16. A testing device for transforming a virtual video on a virtual world to a more real-looking video whose characteristics are similar to those of a real video on a real world while maintaining constant and uniform relationships among frames thereof by using information on previous frames when transforming a current frame, comprising:
at least one memory that stores instructions; and
at least one processor configured to execute the instructions to perform processes of:
(I) on condition that (1) a learning device, under a condition of (i) an N-th virtual training image corresponding to an N-th frame for training of a virtual video for training on the virtual world, (ii) N-th meta data for training on one or more objects for training included in the N-th virtual training image, and (iii) (N-K)-th reference information for training on an (N-K)-th frame for training of the virtual video for training are acquired, has instructed at least one encoding layer in a generating Convolutional Neural Network(CNN) to apply at least one convolutional operation to the N-th virtual training image, the N-th meta data for training and the (N-K)-th reference information for training, to thereby generate at least one N-th feature map for training; (2) the learning device has instructed a decoding layer in the generating CNN to apply at least one deconvolutional operation to the at least one N-th feature map for training, to thereby generate an N-th transformed image for training; (3) the learning device has instructed a discriminating CNN, which is trained adversely to the generating CNN, to apply at least one discriminating CNN operation to the N-th transformed image for training, to thereby generate a first estimated image category score vector including information on probabilities of the N-th transformed image for training being one of real images on the real world or one of virtual images on the virtual world; (4) the learning device has instructed a generating loss layer in the generating CNN to generate at least one generating CNN loss by referring to the first estimated image category score vector and its corresponding first Ground-Truth(GT) image category score vector, and then to perform backpropagation by referring to the generating CNN loss, to thereby learn at least some parameters of the generating CNN, wherein the learning device has instructed the generating loss layer to train said at least some parameters of the generating CNN in order to make a probability of the discriminating CNN misdetermining a category of an image to be outputted from the generating CNN larger, wherein at the process of (1), the processor instructs at least one adjusting layer in the generating CNN to apply at least one adjusting operation to the at least one N-th feature map by referring to an N-th random seed value, to thereby generate at least one N-th adjusted feature map, and at the process of (2), the processor instructs the decoding layer to apply the deconvolutional operation to the at least one N-th adjusted feature map, to thereby generate the N-th transformed image, and the processor repeats (1), (2), (3), and (4) for each of the virtual video on the virtual world, wherein each random seed value with its corresponding different index is separately and independently generated if under a condition of (i) an N-th virtual testing image corresponding to an N-th frame for testing of a virtual video for testing on the virtual world, (ii) N-th meta data for testing on one or more objects for testing included in the N-th virtual testing image, and (iii) (N-K)-th reference information for testing on an (N-K)-th frame for testing of the virtual video for testing are acquired, instructing the encoding layer in the generating CNN to apply the convolutional operation to the N-th virtual testing image, the N-th meta data for testing and the (N-K)-th reference information for testing, to thereby generate at least one N-th feature map for testing; and (II) instructing the decoding layer in the generating CNN to apply the deconvolutional operation to the at least one N-th feature map for testing, to thereby generate an N-th transformed image for testing.

17. The device of claim 16, wherein the processor further performs a process of:
(III) performing (i) a process of inputting a transformed video for testing including the N-th transformed image for testing as its N-th frame for testing to an autonomous driving CNN as a training data, and (ii) a process of inputting an annotated transformed video for testing corresponding to the transformed video for testing to the autonomous driving CNN as a Ground-Truth(GT), to thereby support a training process of the autonomous driving CNN.

18. The device of claim 17, wherein, at the process of (III), the annotated transformed video for testing is acquired from a simulation module which has simulated the virtual world corresponding to the virtual video for testing.

19. The device of claim 16, wherein, at the process of (I), the processor instructs at least one adjusting layer in the generating CNN to apply at least one adjusting operation to the at least one N-th feature map for testing by referring to an N-th random seed value, to thereby generate at least one N-th adjusted feature map for testing, and
wherein, at the process of (II), the processor instructs the decoding layer to apply the deconvolutional operation to the at least one N-th adjusted feature map for testing, to thereby generate the N-th transformed image for testing.

20. The device of claim 16, wherein, at the process of (I), the processor (i) acquires (i-1) the N-th meta data for testing including information on one or more locations and one or more classes of the objects in the N-th virtual testing image and (i-2) the (N-K)-th reference information for testing including at least part of an (N-K)-th virtual testing image, an (N-K)-th transformed image for testing and (N-K)-th meta data for testing corresponding to the (N-K)-th frame for testing of the virtual video for testing, and (ii) instructs the generating CNN to apply the convolutional operation to the N-th virtual testing image, the N- th meta data for testing and the (N-K)-th reference information for testing, to thereby generate the at least one N-th feature map for testing.

* * * * *